July 17, 1956  T. J. PEARCE ET AL  2,755,176
PLANT FOOD MANUFACTURE
Filed Nov. 3, 1952
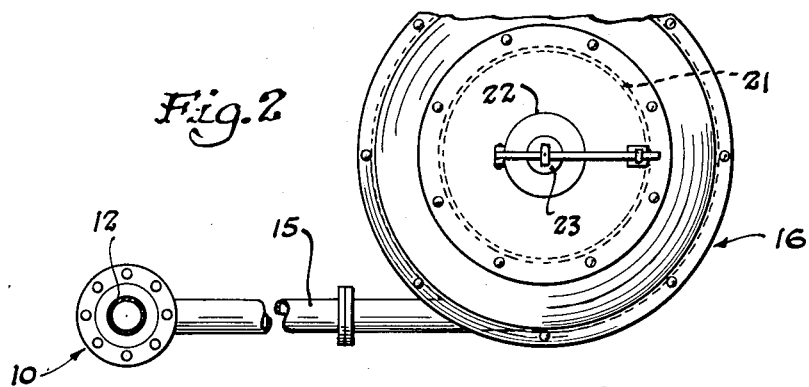
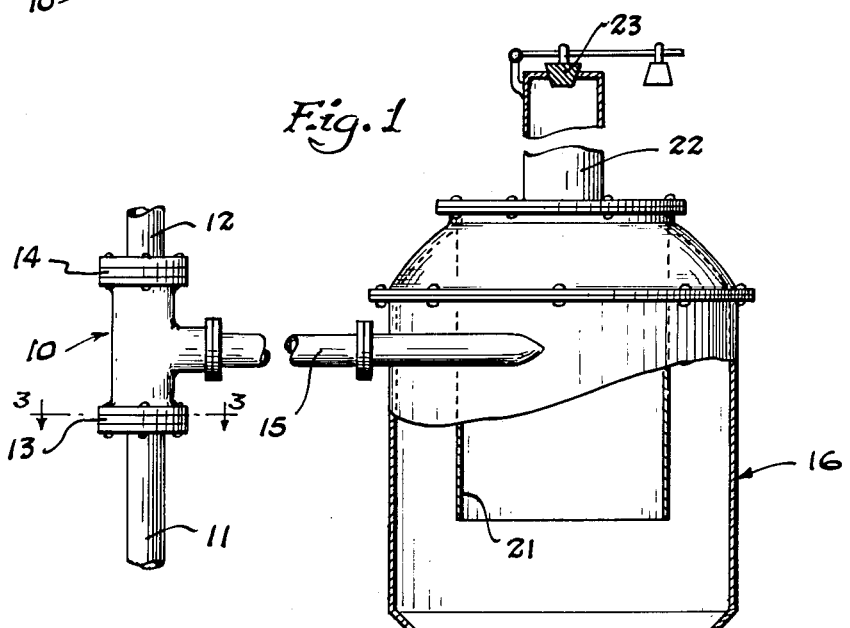
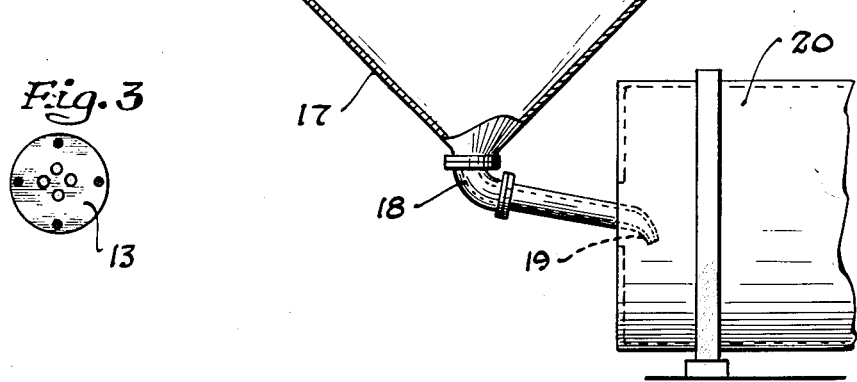
INVENTORS
Thomas J. Pearce
Everett N. Mortenson
BY
R.G. Story
ATTORNEY

United States Patent Office 2,755,176
Patented July 17, 1956

2,755,176

PLANT FOOD MANUFACTURE

Thomas J. Pearce, Bartow, Fla., and Everett N. Mortenson, Chicago, Ill., assignors to Swift & Company, Chicago, Ill., a corporation of Illinois Application November 3, 1952, Serial No. 318,368

7 Claims. (Cl. 71—31)

The present invention relates in general to an improved process and apparatus for the manufacture of certain salts produced by contacting acids with alkalis, particularly such salts as may be immediately employed in various chemical operations.

The invention to be described below is particularly applicable to the production of ammonium sulphate and ammonium phosphate, these salts being in wide demand as fertilizer additives.

It has become readily apparent that ordinary methods of providing such salts through entirely "in situ" acid-alkali reactions carried on in the presence of other ingredients, e. g., fertilizer superphosphates, are somewhat inefficient primarily because they result in the loss of quantities of gaseous alkali during the venting of generated steam. Furthermore, the previously used "in situ" fertilizer salt processes result in temperatures so unreasonably high as to cause the reversion of available phosphoric acid in the super to an insoluble form, for example, tricalcium phosphate.

Therefore, it has been thought desirable to produce the salt by an acid-alkali reaction before admixing other ingredients so as to eliminate the ammonia loss and heat problems. By the use of concentrated reactants it is possible to minimize material handling costs and reaction chamber size requirements as well as to promote both the speed and completeness of the desired reaction.

However, previously employed absorption chambers have been largely incapable of dealing with violently exothermic reactions of the type observed when strong acids and alkalis are used. Contacting an ammoniacal substance with a concentrated acid, as any laboratory technician is aware, may cause the discharge of jets of acid solution from the absorption vessel with a consequent loss of materials and undue hazard to the operator. Furthermore, the pressure exerted on the reactor walls often causes structural failures. An additional problem has been presented by the huge quantities of steam evolved. By way of illustration, if it is desired to neutralize 98 pounds of 100% $H_2SO_4$ or its equivalent, 127 pounds of 60° Bé. acid, to the acid salt, the heat released would amount to 57,240 B. t. u. or enough heat to vaporize almost 60 pounds of water. As a gas, this amount would have a volume of 1,500 cubic feet at a pressure of one atmosphere. If a reactor is used in conjunction with a batch fertilizer mixer, the steam passes with the salt into the mixing shell so as to unduly raise the temperature and moisture content of the product and thereby cause undesirable caking and a tendency on the part of the phosphates to revert to the unavailable form. In short the effects are identical to those observed in the case of the previously described "in situ" reaction. Furthermore, in practice salt leaving the reactor vessel is acid and consequently requires further treatment with an ammoniacal substance in the mixing shell. The steam, however, entrains and sweeps away any additional ammonia gas introduced before it has had an opportunity to contact and completely neutralize such acid.

The above mentioned difficulties have made it necessary in the past to carry out the absorption reaction under careful scrutiny and in small batches.

It is accordingly an object of this invention to provide a novel, commercially feasible method and an apparatus capable of continuous and virtually unattended operation for contacting a strongly ammoniacal substance with a highly concentrated acid material in such a manner as to result in a relatively subdued reaction yielding a product having a fluid consistency thereby making it easily removable from the reaction chamber.

An additional object is to provide a method and apparatus whereby substantially all of the ammoniacal substances originally introduced may be recovered in the salt product.

Another object is to provide, in a salt manufacturing process, a means for venting steam generated in such a fashion as to avoid the ammonia losses encountered in prior art processes while providing a source of relatively pure low pressure steam.

It is yet another object of this invention to aid in expressing the desired salt from the vessel in which it is collected through the simple harnessing of readily available steam energy.

One additional object is to provide a method and apparatus particularly adapted for use in conjunction with a rotary drum type fertilizer mixer which avoids the necessity for purging steam through the fertilizer material contained in the mixing shell, thus facilitating control of the temperature and moisture conditions within the mixer.

Various other and ancillary objects and advantages will become apparent during the course of the explanation below.

A complete understanding of the invention may be gained by reference to the following description and accompanying drawings which together disclose the individual features and combinations thereof, both as to the apparatus and process, which constitute the essential novelty.

In the drawings:

Fig. 1 is a side view, partially in section, of the acid-alkali T reactor and the reaction product separator.

Fig. 2 is a top plan view of the apparatus of Fig. 1.

Fig. 3 is a plan view of one of the two identical orifice plates through which the reactants are introduced into the mixing T.

Referring now to Fig. 1, a relatively small mixing T 10 of suitable noncorroding composition, such as "Duriron" or "Monel" metal or the like, is fed by alkali and acid intake pipes 11 and 12 which are themselves connected to a suitable reactant source (not shown). Orifice plates 13 and 14, positioned at either entrance of the mixing T, are also of a suitable noncorroding alloy material. Each of these plates is provided, as shown in Fig. 3, with one or a number of holes, two to six being preferred, generally about ¼ inch in diameter. Herein lies one particularly significant feature of this invention, for it is the size and number of these apertures which largely determine the smoothness and completeness of the reaction. This will be discussed somewhat more in detail below.

A mixing tube 15, again of a suitable noncorroding material, preferably having an inside diameter somewhat less than that of the mixing T and a length sufficient to provide an opportunity for the complete absorption of any free ammonia by the acid during its passage through the tube, connects the mixing T 10 with a cyclone separator 16 in such a fashion that the products passing therethrough will be injected tangentially into said separator. The tube may be provided with suitable flow-disturbing elements, e. g., helicals, baffles, tortuous flow channels, and Venturi throat sections, so as to cause turbulence and to further insure completion of the absorption reaction. The cyclone separator 16 is also of corrosion-resistant material. Lead lined steel units having an overlying layer of high temperature fused acid-resistant brick have worked satisfactorily since lead coated steel resists corrosion while the somewhat acid permeable brick provides protection against abrasion. The unit is provided with a conical drain section 17 which constitutes the lower portion of the separator. This terminates in a drain pipe 18 which is itself provided with a restricted orifice 19 emptying into the fertilizer mixing shell 20. An open bottom central cylinder 21 extends downwardly from 2/3 to 3/4 of the vertical side wall depth of the separator 16 and has a diameter preferably between 1/2 and 3/4 thereof. Steam duct 22 is provided with a suitable back pressure control valve or orifice choke 23 constructed so as to keep the pressure within the chamber slightly above atmospheric. This pressure, however, will always remain below that present within the mixing T if the process is carried on continuously.

In operation the ammoniacal substance is supplied through line 11 under a pressure at least sufficient to overcome that developed within the absorption system at any time. An acid such as sulphuric or phosphoric under a similar pressure is simultaneously conveyed to the mixing T through line 12. The concentrations of the acid and alkali solutions introduced are governed by certain considerations which will be discussed later.

The limited size of the mixing chamber 10 in conjunction with the pressure under which the concentrated reactants are delivered through the lines 11 and 12 insures virtually complete absorption of the partially gaseous ammoniacal substance. It is impractical to approach complete neutralization of the acid molecules at this point since the reaction becomes progressively slower and less efficient and the ammonia losses greater as the acid-alkali portions become more nearly equal. It has been found that practically all the ammoniacal substance will be absorbed when approximately 70 percent of the acid molecules are neutralized. In this manner any necessity for installation of complex gas recovery equipment is avoided. The resultant acid salt may be further treated in the mixing shell to yield the normal product.

Following the initial reaction the acid salt dissolved in the unvaporized water present is promptly swept along with any unreacted acid or ammonia from the chamber 10 to the mixing tube 15 by huge quantities of steam, roughly 200 volumes to 1 of all other products. Even in the presence of flow disturbing elements the gas and entrained products may move through the tube at speeds approaching 500 feet per second. The resulting turbulence insures that any ammonia gas which has escaped unreacted from the chamber will be given a further opportunity to contact the acid substance. On tangentially entering the cyclone unit 16 the steam swirls rapidly around with sufficient force to throw the relatively heavy suspended salt solution droplets against the walls in the fashion of any centrifugal separation operation. The steam, now practically free of the droplets, finds it way into the chamber circumscribed by the central cylinder 21 and passes upwardly through the duct 22. The back pressure control valve or orifice 23 is adjusted to maintain pressure within the chamber while providing a steam exit. For the purposes of this invention a pressure of about 2 to 5 pounds per square inch gage is usually sufficient.

Meanwhile the acid salt solution, after having been deposited on the separator walls, drains to the lower conical portion 17 and finally to the discharge line 18. At this point the pressure which results from throttling the steam escape orifice operates to force the solution through the line and, in the preferred embodiment, to spray it from the nozzle 19 into the fertilizer mixing shell 20. Consequently gravitational force alone does not have to be relied upon to insure the passage of what is possibly only a semiliquid solution and a smooth uninterrupted product flow into the fertilizer tumbler is insured. Hence, a means is provided whereby a salt solution may be evenly distributed throughout a considerably greater volume of ingredients. As will be pointed out below, the emerging salt solution or slurry generally contains substantial quantities of free acid. In fact, in the preferred embodiment of the invention, the acid is only about 70% neutralized. Consequently, the salt forced through nozzle 19 into the mixing shell 20 must be further neutralized with a suitable basic material, ammonia for example, while being intimately mixed with and contacted by the solid materials in the mixing shell.

The orifice plates 13 and 14, previously referred to, are provided with holes of such a size and in such a number to cause a liquid pressure drop across each plate of from 2 to 15 pounds per square inch. A 5 pound drop has been found particularly satisfactory. This eliminates the erratic flowing or "slugging" effect which would normally be expected to attend a reaction of such violence. If the pressure within the chamber is allowed to approach that exerted on the reactants, each explosion momentarily halts the acid flow resulting in the admission of excess ammoniacal substance which will vaporize on striking the hot mixing chamber and escape unabsorbed. Though a single orifice hole, spray nozzle, or pinched pipe might be employed, it has been found most desirable to introduce multiple streams into the T so as to assure both a smooth and complete reaction.

In commercial operation a 30 percent ammonium content aqua ammonia solution (B liquor) may be neutralized with 60° Bé. (77.67%) sulphuric acid. It has been found that the operation goes most smoothly and efficiently when the acid is somewhat less than 70 percent neutralized to ammonium sulphate. Neutralization in excess of 70 percent or using more concentrated reactants results in incomplete absorption of the ammoniacal substance as well as raising the concentration of the salt solution sufficiently high to exceed the saturation point at the prevailing product temperature (238° F.). The salting out which results will cause clogging in both reactor and mixing tube.

When phosphoric acid is chosen as the acid reactant, the prevailing temperature must be kept below 170° F. as a precaution against decomposition of the ammonium phosphate. Consequently, it is inadvisable to carry the absorption beyond the point where 60–70 percent of the acid molecules present (by weight) are neutralized.

Full scale units employing 3 to 6 inch mixing T's, 4 to 10 foot mixing tubes, and cyclone separators 3 to 3½ feet in diameter supply sufficient acid ammonium salt for use with a batch fertilizer mixer of standard capacity (2 ton). The process is extremely efficient, 99 percent ammoniacal material absorption being not uncommon when the reaction is confined to a small chamber and highly concentrated reactants are employed. A reduction in labor to a minimum is effected since the materials used are all liquid and, once their proper flow rates are determined, can be allowed to combine without further attention.

The elimination of excess water from the reaction products makes them unusually fine fertilizer ingredients since control of the moisture content of the ingredients affords an accurate means for regulating the degree of granulation imparted to the fertilizer product. Fertilizer material displays a tendency to lump in the presence of excess water.

The invention has been described as being particularly applicable to the manufacture of ammonium sulphate or phosphate, these two salts being heavily in demand as fertilizer additives. However, it is readily apparent that the process is useful as applied to any fertilizer additive manufacturing process which results in the generation of quantities of unwanted steam.

Streams of various acid and alkali substances may be employed so as to produce mixed salt solutions while gases, for example, sulphur dioxide and ammonia, may be used as the other reaction components. Water to solubilize the resultant salts and to carry away excess heat may be introduced through a separate reactor inlet.

Furthermore, though it has been indicated that the reaction proceeds more rapidly and with more overall efficiency when concentrated acids are only partially neutralized, it is within the scope of the invention to carry the reaction to completion, it being necessary, of course, to provide dilute reactants or additional water to avoid undesirable salting out of the reaction products.

As indicated previously, though the process may be carried on in a continuous fashion with a minimum of labor and material waste, batch operation is possible though somewhat less efficient.

Obviously, many modifications and variations of the invention as hereinbefore set forth may be made without departing from the spirit and scope thereof, and therefore only such limitations should be imposed as are indicated in the appended claims.

We claim:

1. In a continuous process for the manufacture of mixed fertilizers wherein inorganic salts are preformed and subsequently admixed with fertilizer material, the improvement which comprises: continuously passing streams of strong mineral acid and a basic substance into a reaction zone; contacting said mineral acid and said basic substance within said zone whereby to react said mineral acid with said basic substance in a smooth uninterrupted fashion whereby to form a gaseous product comprising steam and a hot non-gaseous product; passing said gaseous product and said hot non-gaseous product into a second zone; separating the gaseous from the non-gaseous product therein; and immediately thereafter passing said non-gaseous product into a third zone containing fertilizer material and admixing said non-gaseous product with said fertilizer material while maintaining substantially the entirety of said gaseous product out of contact with said fertilizer material in said third zone.

2. In a continuous process for the manufacture of mixed fertilizers wherein inorganic salts are preformed and subsequently admixed with fertilizer material, the improvement which comprises: continuously passing streams of strong mineral acid and basic substance into a reaction zone; contacting said mineral acid within said zone with sufficient basic substance to partially neutralize said mineral acid whereby to form a flowable slurry and a hot gaseous product comprising steam; passing said hot gaseous product and flowable slurry into a second zone wherein the slurry is separated from the gaseous product by centrifugal action; withdrawing a portion of said gaseous product from said second zone while simultaneously retaining a portion of said gaseous product within said zone whereby to maintain the pressure therein at a predetermined level above atmospheric pressure; forcing said slurry from said second zone into a third zone by means of the superatmospheric pressure prevailing in said second zone; and immediately thereafter admixing said slurry with said fertilizer material in said third zone while maintaining substantially the entirety of said gaseous product out of contact with said fertilizer material in said third zone.

3. A method as in claim 2 wherein the mineral acid is sulfuric acid and the basic substance is an ammoniacal substance.

4. A method as in claim 2 wherein the mineral acid is phosphoric acid and the basic substance is an ammoniacal substance.

5. In a continuous process for the manufacture of mixed fertilizers wherein inorganic salts are preformed and subsequently admixed with fertilizer material, the improvement which comprises: continuously passing streams of strong mineral acid and basic substance into a reaction zone; contacting said mineral acid within said zone with sufficient basic substance to partially neutralize said mineral acid in a smooth uninterrupted fashion whereby to form a hot gaseous product comprising steam and a hot non-gaseous product; passing the hot gaseous and the hot non-gaseous products into a second zone wherein the gaseous product is separated from the non-gaseous product by centrifugal action; withdrawing a portion of the gaseous product from said second zone while simultaneously retaining a portion of said gaseous product within said zone whereby to maintain the pressure therein at a predetermined level above atmospheric pressure; forcing the non-gaseous product from said zone by means of the superatmospheric pressure prevailing therein into a tumbling zone while maintaining substantially the entirety of said gaseous product out of contact with the contents of said tumbling zone; and thereafter further treating the non-gaseous product in said tumbling zone with a basic substance to complete neutralization thereof.

6. A method as in claim 5 wherein the mineral acid is sulfuric acid and the basic substance is an ammoniacal material.

7. A method as in claim 5 wherein the mineral acid is phosphoric acid and the basic substance is an ammoniacal material.

References Cited in the file of this patent

UNITED STATES PATENTS

| | | |
|---|---|---|
| 1,320,719 | Stutzke | Nov. 4, 1919 |
| 2,022,813 | Ruys | Dec. 3, 1935 |
| 2,047,394 | Siems | July 14, 1936 |
| 2,561,394 | Marshall | July 24, 1951 |
| 2,566,223 | Mackay | Aug. 28, 1951 |
| 2,587,367 | Moritz | Feb. 26, 1952 |
| 2,618,547 | Davenport et al. | Nov. 18, 1952 |